(12) United States Patent
Al-Hannabi et al.

(10) Patent No.: US 10,724,669 B1
(45) Date of Patent: Jul. 28, 2020

(54) SINGLE ACTUATION PROBE OR TOOL DEPLOYMENT MECHANISMS FOR IN-PIPE APPLICATIONS

(71) Applicant: Saudi Arabian Oil Company, Dhahran (SA)

(72) Inventors: Abdoulelah Al-Hannabi, Thuwal (SA); Mohamed Abdelkader, Thuwal (SA); Hassane Trigui, Thuwal (SA); Sahejad Patel, Thuwal (SA); Fadl Abdellatif, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/596,369

(22) Filed: Oct. 8, 2019

(51) Int. Cl.
| | | |
|---|---|---|
| *G01B 5/12* | (2006.01) | |
| *F16L 55/28* | (2006.01) | |
| *F16L 101/30* | (2006.01) | |

(52) U.S. Cl.
CPC ........... *F16L 55/28* (2013.01); *F16L 2101/30* (2013.01)

(58) Field of Classification Search
CPC ...................................................... F41L 55/28
USPC ......................................................... 33/544.1
See application file for complete search history.

(56) References Cited

U.S. PATENT DOCUMENTS

| | | | | | |
|---|---|---|---|---|---|
| 3,762,057 | A | * | 10/1973 | Kaifesh ................. | G01B 5/12 33/794 |
| 3,765,097 | A | * | 10/1973 | Woelich ................. | G01B 3/34 33/555.2 |
| 3,857,182 | A | * | 12/1974 | Van Riemsdijk ...... | G01C 22/02 33/777 |
| 4,481,816 | A | * | 11/1984 | Prentice ................. | G01B 5/12 33/544.2 |
| 4,722,142 | A | * | 2/1988 | Schmidt ................ | G01B 7/105 324/230 |
| 5,088,336 | A | * | 2/1992 | Rosenberg ............. | G01B 5/207 33/544 |
| 5,182,862 | A | * | 2/1993 | Frank ..................... | G01B 5/204 33/199 R |
| 5,426,507 | A | * | 6/1995 | Rando .................... | G01B 11/27 33/286 |
| 7,421,914 | B2 | * | 9/2008 | Stanley .................. | F16L 55/28 33/544.3 |
| 10,005,180 | B2 | | 6/2018 | Roberts et al. | |
| 2003/0189713 | A1 | * | 10/2003 | Lam ...................... | G01B 11/105 356/635 |

(Continued)

*Primary Examiner* — George B Bennett
(74) *Attorney, Agent, or Firm* — Leason Ellis LLP (57) ABSTRACT

An in-pipe inspection or maintenance apparatus comprises: a single rotational and radial deployment mechanism to both rotationally deploy a probe or tool about an inner circumference of a pipe with respect to the axis of the pipe and radially deploy the probe or tool to first and second target points on the inner circumference; and a single actuator to automatically actuate the rotational and radial deployment mechanism to perform both the rotational and radial deployments of the probe or tool. The rotational and radial deployment mechanism is further configured to: rotate the probe or tool and radially extend the probe or tool to the first target point in response to the single actuator actuating the rotational and radial deployment mechanism; and rotate the probe or tool from the first target point to the second target point in response to the single actuator further actuating the rotational and radial deployment mechanism.

30 Claims, 9 Drawing Sheets

(56) References Cited

U.S. PATENT DOCUMENTS

| | | | |
|---|---|---|---|
| 2008/0154277 A1 | 6/2008 | Machalk et al. | |
| 2015/0007440 A1* | 1/2015 | Baba | G01B 5/12 33/542 |
| 2015/0285607 A1* | 10/2015 | Helmore | E21B 47/02 33/558.2 |
| 2016/0145998 A1* | 5/2016 | Myeong | E21B 47/09 33/302 |

* cited by examiner

FIG. 9

SINGLE ACTUATION PROBE OR TOOL DEPLOYMENT MECHANISMS FOR IN-PIPE APPLICATIONS

FIELD OF THE DISCLOSURE

The present disclosure relates to pipeline sensing and maintenance in general, and specifically to a pipeline apparatus having a single actuation probe or tool deployment mechanism for in-pipe applications.

BACKGROUND OF THE DISCLOSURE

In automated pipeline technology, in-pipe inspections and maintenance can be challenging tasks as they can require certain functions to be executed in a limited space using remotely operated or autonomous robots and crawlers. Robots and crawlers equipped with sensory features and maintenance tools drive inside the pipe and perform certain tasks at specific locations. In performing an in-pipe inspection or maintenance task, the robotic system or crawler usually uses two actuators, for example, to independently account for rotation deployment and radial deployment of the probe or tool. Here, the rotation deployment can include, for example, the position or angle in the circumferential dimension. However, this design can add wiring complexity and increase the number of actuated components to perform such a task.

It is in regard to these and other problems in the art that the present disclosure is directed to provide a technical solution for an effective pipeline apparatus having a single actuation probe or tool deployment mechanism for in-pipe applications.

SUMMARY OF THE DISCLOSURE

According to an embodiment, an in-pipe inspection or maintenance apparatus is provided. The apparatus includes: a single rotational and radial deployment mechanism to both rotationally deploy a probe or tool about an inner circumference of a pipe with respect to the axis of the pipe and radially deploy the probe or tool to first and second target points on the inner circumference; and a single actuator to automatically actuate the rotational and radial deployment mechanism to perform both the rotational and radial deployments of the probe or tool. The rotational and radial deployment mechanism is further configured to: rotate the probe or tool and radially extend the probe or tool to the first target point in response to the single actuator actuating the rotational and radial deployment mechanism; and rotate the probe or tool from the first target point to the second target point in response to the single actuator further actuating the rotational and radial deployment mechanism while either retracting the probe or tool from the first target point and extending the probe or tool to the second target point, or continuously deploying the extended probe or tool between the first and second target points.

In an embodiment, the apparatus further includes a longitudinal deployment mechanism to longitudinally deploy the probe or tool in a longitudinal direction along the pipe axis, wherein the longitudinal deployment mechanism includes wheels to align an axis of rotation of the single actuator with the pipe axis.

In an embodiment, the rotational and radial deployment mechanism is further configured to: both rotationally deploy the probe or tool and radially deploy the probe or tool to a third target point on the inner circumference; and rotate the probe or tool from the second target point to the third target point while retracting the probe or tool from the second target point and extending the probe or tool to the third target point, in response to the single actuator still further actuating the rotational and radial deployment mechanism.

In an embodiment, the rotational and radial deployment mechanism includes a grooved path to define a rotational and radial deployment path of the probe or tool (1) to the first target point, (2) from the first target point to the second target point, and (3) from the second target point to the third target point.

In an embodiment, the rotational and radial deployment mechanism further includes: a pin to couple to the probe or tool and guide the probe or tool in accordance with the grooved path; and a slotted arm to transfer a rotational force of the single actuator to the pin to perform the rotational deployment of the probe or tool, the slotted arm having a sliding guide to passively guide the pin along the grooved path to perform the radial deployment of the probe or tool.

In an embodiment, the rotational and radial deployment mechanism includes a cam to define a rotational and radial deployment path of the probe or tool (1) to the first target point, (2) from the first target point to the second target point, and (3) from the second target point to the third target point.

In an embodiment, the rotational and radial deployment mechanism further includes: a cam follower to couple to the probe or tool and passively guide the probe or tool in accordance with a perimeter of the cam; and a rotating arm to couple to the probe or tool and to transfer a rotational force of the single actuator to the probe or tool and the cam follower in order to perform the rotational deployment of the probe or tool while guiding the cam follower along the perimeter of the cam to perform the radial deployment of the probe or tool.

In an embodiment, the rotating arm further includes: a probe or tool guide to passively guide the probe or tool to and from the inner circumference in order to perform the radial deployment of the probe or tool; and a follower guide to passively guide the cam follower along the perimeter of the cam.

In an embodiment, the rotational and radial deployment mechanism further includes: a coupling member to couple the probe or tool to the cam follower; and a spring coupled between the probe or tool guide and the coupling member in order to engage the cam follower with the perimeter of the cam and to absorb force of the radial deployment of the probe or tool on the inner circumference.

In an embodiment, the rotational and radial deployment mechanism includes a mutilated gear to transfer a rotational force of the single actuator to the probe or tool in order to define a rotational and radial deployment path of the probe or tool (1) to the first target point, (2) from the first target point to the second target point, and (3) from the second target point to the third target point.

In an embodiment, the rotational and radial deployment mechanism further includes: a ring gear having a guiding member to passively guide the probe or tool to and from the inner circumference in order to perform the radial deployment of the probe or tool; and a planet gear to passively transfer a rotational force of the mutilated gear to the ring gear in order to perform the rotational deployment of the probe or tool.

In an embodiment, a number of gear teeth of the ring gear is an integer multiple of a number of gear teeth of the mutilated gear.

In an embodiment, the rotational and radial deployment mechanism further includes: a probe or tool connector to rotationally couple to the probe or tool; a gear connector rotationally coupled to the mutilated gear at a pivot point that is offset from an axis of rotation of the mutilated gear; and a spring coupled between the gear connector and the probe or tool connector in order to convert the rotational force of the mutilated gear to a radial force to perform the radial deployment of the probe or tool through the guiding member and in order to absorb force of the radial deployment of the probe or tool on the inner circumference.

In an embodiment, the rotational and radial deployment mechanism further includes: a deploying disk to rotationally couple to the probe or tool in order to transfer a rotational force of the single actuator to the probe or tool to perform both the rotational and radial deployments of the probe or tool; and a limiting disk to passively couple to the probe or tool during the rotational deployment of the probe or tool and in order to have a rotational degree of freedom with respect to the deploying disk and the probe or tool during the radial deployment of the probe or tool.

In an embodiment, the rotational and radial deployment mechanism further includes: an attachment member that is offset from the pipe axis in order to rotationally couple the probe or tool to the deploying disk; and a bearing rotationally coupling the limiting disk to the deploying disk.

According to another embodiment, a method of in-pipe inspection or maintenance is provided. The method includes: using a single rotational and radial deployment mechanism, both rotationally deploying, a probe or tool about an inner circumference of a pipe with respect to the axis of the pipe and radially deploying the probe or tool to first and second target points on the inner circumference; and automatically actuating, using a single actuator, the rotational and radial deployment mechanism to perform both the rotational and radial deployments of the probe or tool. Rotationally deploying and radially deploying include: rotating the probe or tool and radially extending the probe or tool to the first target point in response to the single actuator actuating the rotational and radial deployment mechanism; and rotating the probe or tool from the first target point to the second target point in response to the single actuator further actuating the rotational and radial deployment mechanism while either retracting the probe or tool from the first target point and extending the probe or tool to the second target point, or continuously deploying the extended probe or tool between the first and second target points.

In an embodiment, the method further includes automatically longitudinally deploying the probe or tool in a longitudinal direction along the pipe axis, wherein longitudinally deploying includes using wheels to align an axis of rotation of the single actuator with the pipe axis.

In an embodiment, rotationally deploying and radially deploying further include: both rotationally deploying the probe or tool and radially deploying the probe or tool to a third target point on the inner circumference; and rotating the probe or tool from the second target point to the third target point while retracting the probe or tool from the second target point and extending the probe or tool to the third target point, in response to the single actuator still further actuating the rotational and radial deployment mechanism.

In an embodiment, rotationally deploying and radially deploying further include using a grooved path to define a rotational and radial deployment path of the probe or tool (1) to the first target point, (2) from the first target point to the second target point, and (3) from the second target point to the third target point.

In an embodiment, rotationally deploying and radially deploying further include: coupling a pin to the probe or tool and guiding the probe or tool in accordance with the grooved path using the pin; transferring a rotational force of the single actuator to the pin using a slotted arm to perform the rotational deployment of the probe or tool; and passively guiding the pin along the grooved path using a sliding guide of the slotted arm to perform the radial deployment of the probe or tool.

In an embodiment, rotationally deploying and radially deploying further include using a cam to define a rotational and radial deployment path of the probe or tool (1) to the first target point, (2) from the first target point to the second target point, and (3) from the second target point to the third target point.

In an embodiment, rotationally deploying and radially deploying further include: coupling a cam follower to the probe or tool and passively guiding the probe or tool in accordance with a perimeter of the cam using the cam follower; and coupling a rotating arm to the probe or tool and transferring a rotational force of the single actuator to the probe or tool and the cam follower using the rotating arm in order to perform the rotational deployment of the probe or tool while guiding the cam follower along the perimeter of the cam to perform the radial deployment of the probe or tool.

In an embodiment, rotationally deploying and radially deploying further include: passively guiding the probe or tool to and from the inner circumference using a probe or tool guide of the rotating arm in order to perform the radial deployment of the probe or tool; and passively guiding the cam follower along the perimeter of the cam using a follower guide of the rotating arm.

In an embodiment, rotationally deploying and radially deploying further include: coupling the probe or tool to the cam follower using a coupling member; and coupling a spring between the probe or tool guide and the coupling member in order to engage the cam follower with the perimeter of the cam and to absorb force of the radial deployment of the probe or tool on the inner circumference.

In an embodiment, rotationally deploying and radially deploying further include transferring a rotational force of the single actuator to the probe or tool using a mutilated gear in order to define a rotational and radial deployment path of the probe or tool (1) to the first target point, (2) from the first target point to the second target point, and (3) from the second target point to the third target point.

In an embodiment, rotationally deploying and radially deploying further include: passively guiding the probe or tool to and from the inner circumference using a guiding member of a ring gear in order to perform the radial deployment of the probe or tool; and passively transferring a rotational force of the mutilated gear to the ring gear using a planet gear in order to perform the rotational deployment of the probe or tool.

In an embodiment, a number of gear teeth of the ring gear is an integer multiple of a number of gear teeth of the mutilated gear.

In an embodiment, rotationally deploying and radially deploying further include: rotationally coupling a probe or tool connector to the probe or tool; rotationally coupling a gear connector to the mutilated gear at a pivot point that is offset from an axis of rotation of the mutilated gear; and coupling a spring between the gear connector and the probe or tool connector in order to convert the rotational force of the mutilated gear to a radial force to perform the radial deployment of the probe or tool through the guiding member and in order to absorb force of the radial deployment of the probe or tool on the inner circumference.

In an embodiment, rotationally deploying and radially deploying further include: rotationally coupling a deploying disk to the probe or tool in order to transfer a rotational force of the single actuator to the probe or tool to perform both the rotational and radial deployments of the probe or tool; and passively coupling a limiting disk to the probe or tool during the rotational deployment of the probe or tool, and providing a rotational degree of freedom to the limiting disk with respect to the deploying disk and the probe or tool during the radial deployment of the probe or tool.

In an embodiment, rotationally deploying and radially deploying further include: rotationally coupling the probe or tool to the deploying disk using an attachment member that is offset from the pipe axis; and rotationally coupling the limiting disk to the deploying disk using a bearing.

Any combinations of the various embodiments and implementations disclosed herein can be used. These and other aspects and features can be appreciated from the following description of certain embodiments together with the accompanying drawings and claims.

It is noted that the drawings are illustrative and not necessarily to scale.

DETAILED DESCRIPTION OF CERTAIN EMBODIMENTS OF THE DISCLOSURE

In various example embodiments, an automated pipeline apparatus having a single actuation probe or tool deployment mechanism for in-pipe applications is provided. The pipeline apparatus has a simple and efficient mechanism to perform probe or tool deployment for in-pipe applications by reducing the number of actuators to accomplish the task. To accomplish this, a single actuator is used for both linear (or radial or lateral) probe or tool deployment and rotational probe or tool deployment around the circumference of the inner pipe surface. Different specific embodiments are provided for both discrete point and continuous applications. In discrete point applications, the probe or tool only deploys to a fixed or limited number of locations on the inner circumference, such as four different locations. By contrast, in continuous applications, the probe or tool deploys continuously over a portion or portions of the inner circumference, or over an entirety of the inner circumference, As discussed earlier, in-pipe inspection and maintenance can be a rigorous task as it can require certain functions to be executed in a limited space using remotely operated or autonomous robots or crawlers. Compounding these challenges include managing the rotational and lateral deployments of the probe or tool to the desired locations on the inner circumference of the pipe. This is usually addressed using multiple actuators to accomplish the different movements. This, however, complicates the design, which increases the risk of deploying to unintended areas or increases the amount of physical hardware (and corresponding electronics) to manage the deployments.

Accordingly, in example embodiments, a pipeline apparatus provides a solution to the aforementioned technical problem by having reduced complexity and a reduced number of actuated parts configured to deploy a probe or tool circumferentially for in-pipe applications. In one such embodiment, a mutilated gear mechanism is used to eliminate one actuation yet still provide all of the degrees of movement described herein. In another such embodiment, a cam follower mechanism is used to eliminate one actuation to the same technical advantage. In yet another such embodiment, a grooved path and slotted arm mechanism is used to eliminate one actuation, again, in support of the same technical advantage. In still yet another such embodiment, a probe or tool rotates and deploys continuously using a single actuator, again, in support of the same technical advantage.

In example embodiments, the probe or tool deployment is performed at a set or predetermined number of positions (e.g., spots) on the inner circumference, or is performed continuously over a set or predetermined portion or entirety of the inner circumference. For example, dry film thickness (DFT) measurements are often taken at four different locations (e.g., evenly spaced locations) on the inner circumference, such as using a DFT probe at the 12 o'clock, 3 o'clock, 6 o'clock, and 9 o'clock positions, or at the 1:30, 4:30, 7:30, and 10:30 positions, as non-limiting exemplary positions. For another example, holiday testing can be performed by the deployed probe or tool to effectuate nondestructive testing on protective coatings in order to detect unacceptable discontinuities such as pinholes and voids. Holiday testing is often performed continuously using a brush to scan a portion of the inner circumference surface for pinholes, and the probe or tool can be deployed by the single actuator arrangement of the present disclosure so as to be positionable longitudinally and radially throughout the interior of the pipe.

While the DFT probe is used throughout as an example discrete point deployment probe or tool and the holiday testing brush is used throughout as an example continuous deployment probe or tool, the present disclosure is not limited thereto. In other embodiments, other in-pipe probes or tools can be used, such as an ultrasonic thickness probe, or a probe or tool for any coating inspection application. In addition, while for ease of description, the example discrete point embodiments discussed throughout use four evenly spaced points on the inner circumference (e.g., 90 degrees or three hours apart from neighboring points), the present disclosure is not limited thereto. In other discrete point embodiments, the number of points and their spacing can vary.

According to some embodiments, a single motor is used to rotate and (radially) deploy probes and tools for in-pipe applications. This reduces the number of actuations usually used to perform such in-pipe applications. The following description and illustrations focus on several different example embodiments, covering discrete point and continuous deployment apparatuses. However, the present disclosure is not limited thereto. Other embodiments are directed to any pipeline apparatus having a single actuation probe or tool deployment mechanism for in-pipe applications, as would be apparent in light of this disclosure.

Figure 1:
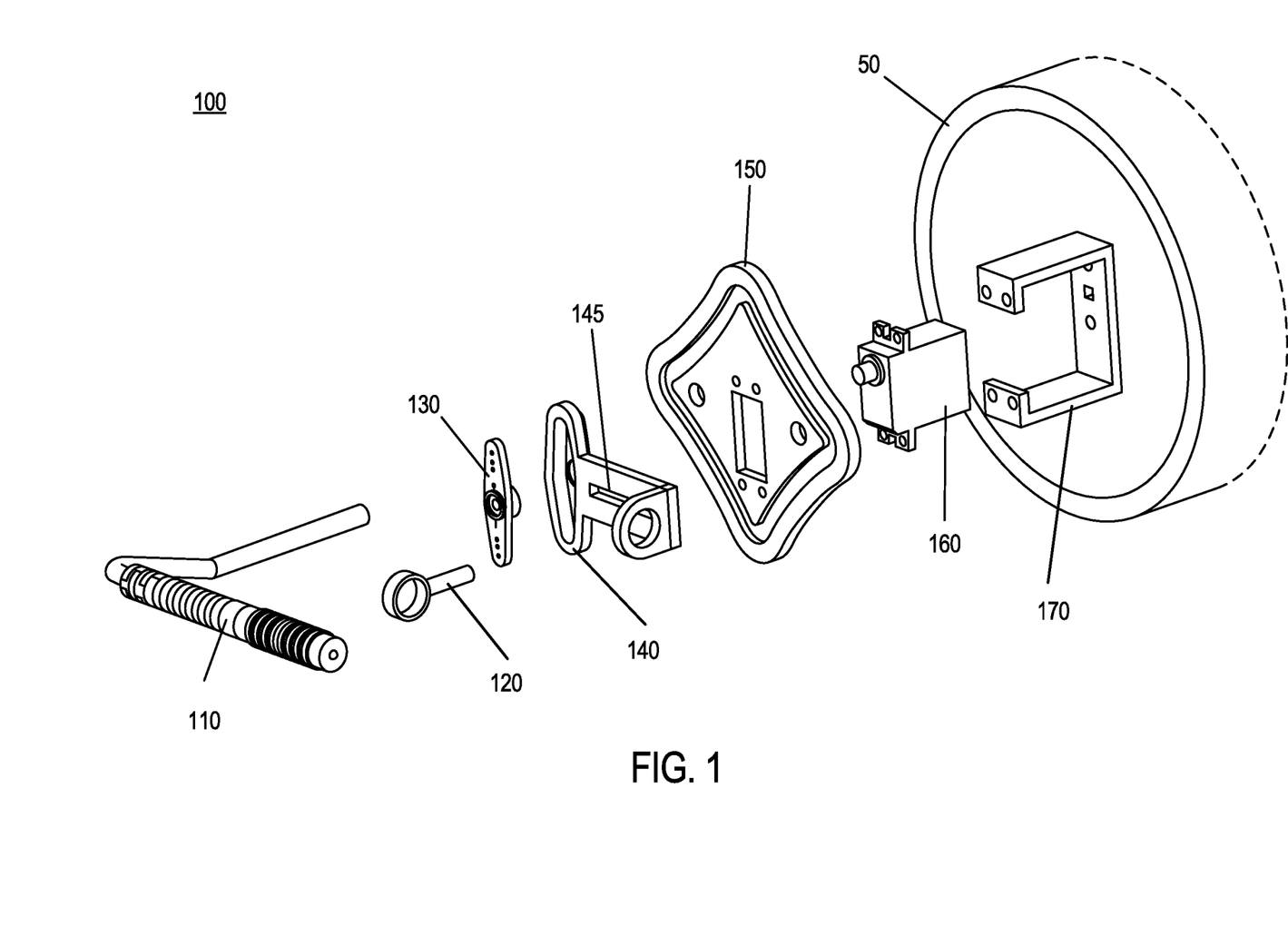
FIG. 1 is an exploded view of an example pipeline apparatus having a single actuation probe or tool deployment mechanism for discrete point (e.g., spot) in-pipe applications, according to an embodiment.
Figure 2A:
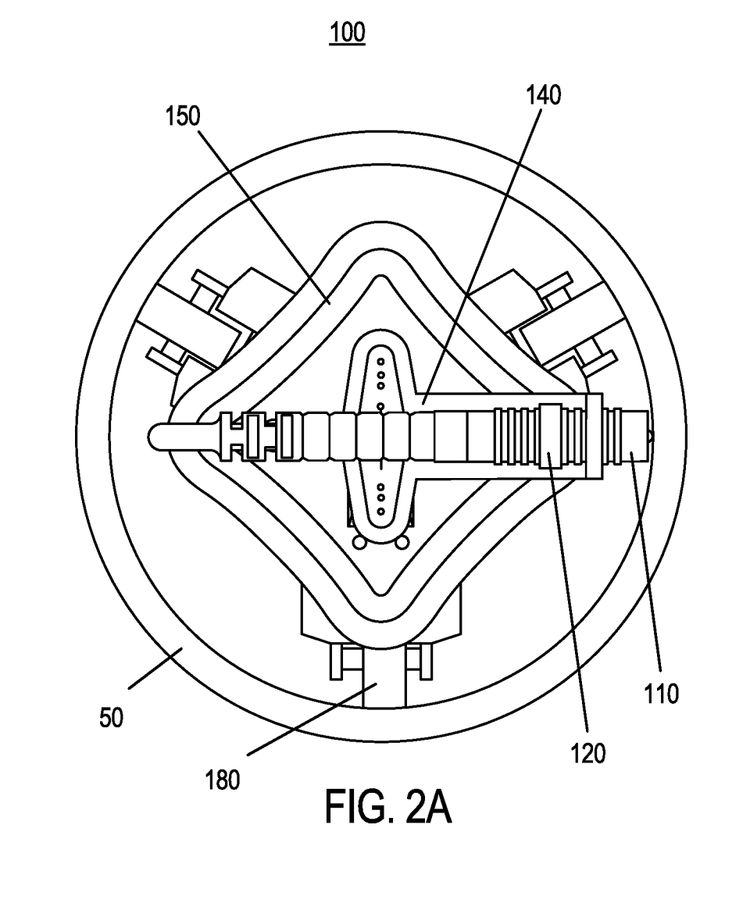
FIGS. 2A and 2B are example front views of the pipeline apparatus of FIG. 1, in extended and retracted positions, respectively, according to an embodiment.
Figure 2B:
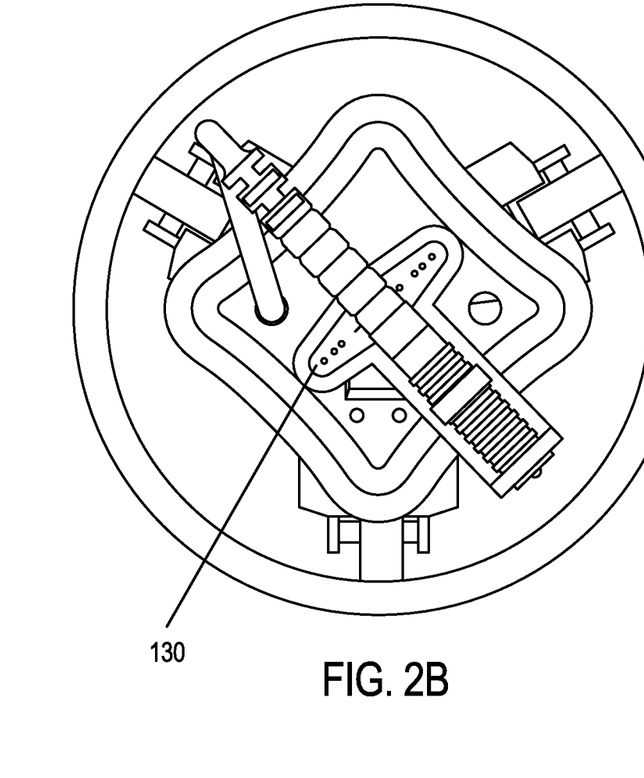

FIG. 1 is an exploded view of an example pipeline apparatus 100 having a single actuation probe or tool deployment mechanism for discrete point (e.g., spot) in-pipe applications, according to an embodiment. FIGS. 2A-2B are example front views of the pipeline apparatus 100 of FIG. 1, in extended and retracted positions, respectively, according to an embodiment. In the pipeline apparatus embodiment of FIGS. 1-2B, a mechanism for deploying a probe 110 (such as a DFT probe) and that is supported and centered (e.g., by wheels 180) with respect to a pipe 50 is provided. The pipeline apparatus 100 includes a stationary grooved path 150, a rotating slotted arm 140 having a sliding guide 145 or slot, a probe pin 120, and a single motor 160 with an adapter 130 and mounting 170.

In some embodiments, the pipeline apparatus 100 further includes a longitudinal deployment mechanism (such as the wheels 180 and a motor) for longitudinal deployment (e.g., along the pipe axis). The longitudinal deployment can include navigating obstacles such as weld beads that are part of the same pipeline. For example, in an embodiment, the longitudinal deployment mechanism includes a motor to rotate one or more axles that drive a corresponding one or more sets of wheels (along with the rest of the apparatus 100) in the longitudinal direction. As an example, the longitudinal movement of the apparatus 100 can be for a set or predetermined distance, or to a set or predetermined location, or the like.

The grooved path 150 is designed to make the probe pin 120 that holds the probe 110 take four measurements along the surface of the inner pipe 50, specifically at 3 o'clock (FIG. 2A), 6 o'clock, 9 o'clock, and 12 o'clock (e.g., when the grooved path 150 is closest to the inner wall of the pipe 50, and the tip of the probe 110 is fully extended and touches the inner wall). At other positions in the grooved path, the probe 110 is partially or fully retracted and does not take measurements. At four positions, specifically 1:30, 4:30 (FIG. 2B), 7:30, and 10:30, the grooved path 150 is farthest from the inner wall and the probe 110 is fully retracted. The motor mounting 170 is for securely mounting the motor 160 to the rest of the pipeline apparatus 100 at the desired location, such as to center an axis of rotation of the motor 160 with the axis of the pipe 50.

The slotted arm 140 uses the motor adapter 130 to transfer the rotational power of the motor 160 into rotational movement about the axis of rotation of the motor 160. The slotted arm 140 further uses and sliding guide 145 (or slot) to deploy the probe pin 120 laterally (radially) as defined by the grooved path 150. By extension, since the head of the probe 110 is attached to the probe pin 120, this lateral deployment also laterally deploys the probe 110. Accordingly, by varying the grooved path 150, any number of discrete points on the inner wall (circumference) can be deployed to by the probe 110, and any appropriate retraction can take place between the deployment points. Put another way, the probe pin 120 holds the probe 110 and follows the grooved path 150 through the slotted arm 140 as the slotted arm 140 rotates using a drive motor 160. This continues until the desired points or motion of deployment to take measurements with the probe 110 (e.g., FIG. 2A) is reached. Between the deployment points, the desired points or regions of retraction (e.g., FIG. 2B) take place.

Figure 3A:
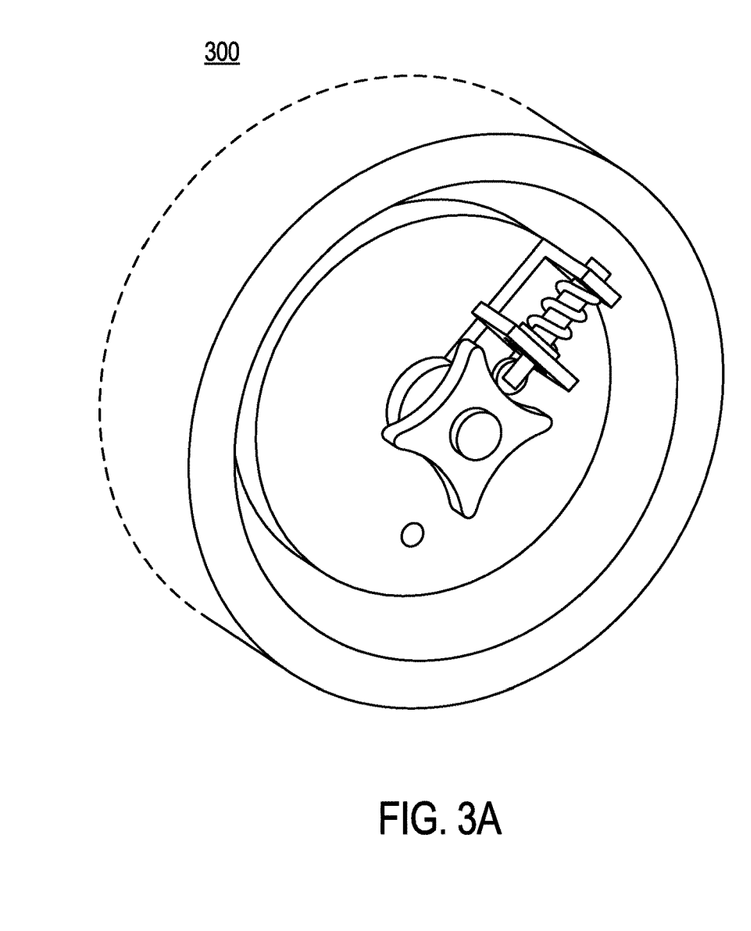
FIGS. 3A and 3B are oblique and front views, respectively, of an example pipeline apparatus having a single actuation probe or tool deployment mechanism for discrete point in-pipe applications, according to another embodiment.
Figure 3B:
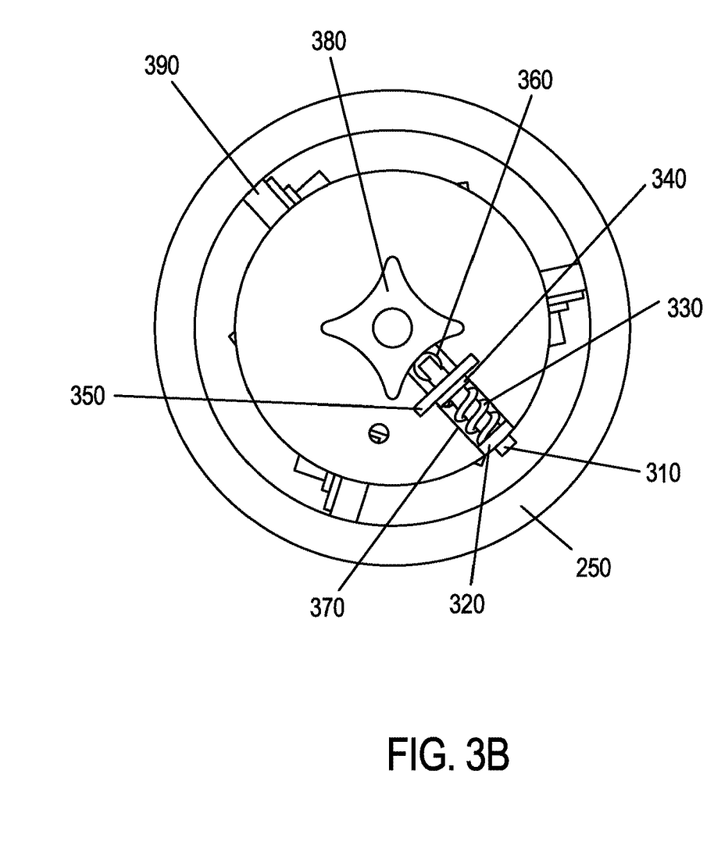
Figure 4A:
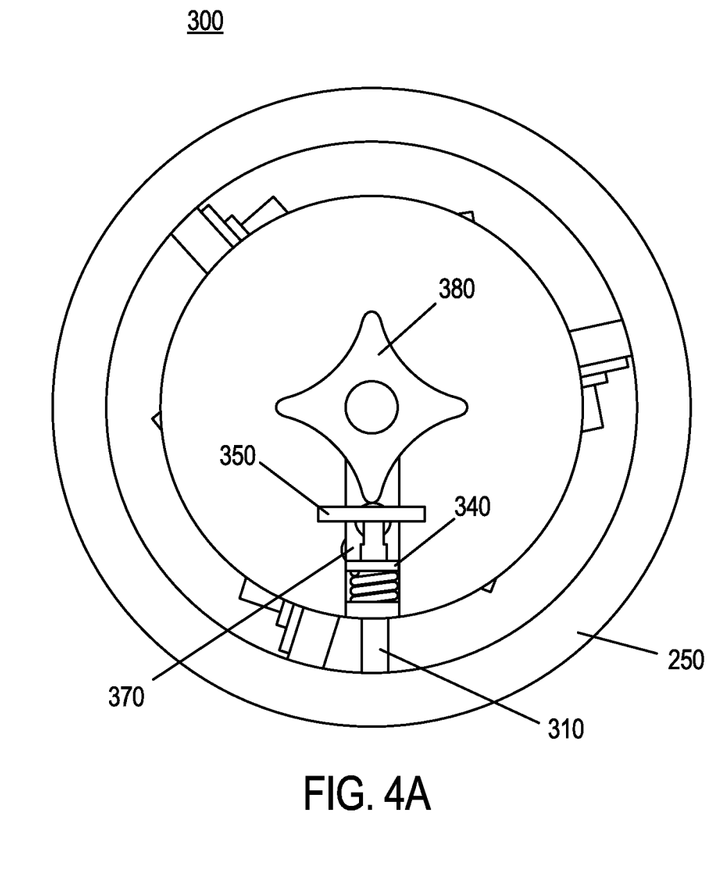
FIGS. 4A and 4B are example front views of the pipeline apparatus of FIGS. 3A and 3B, in extended and retracted positions, respectively, according to an embodiment.
Figure 4B:
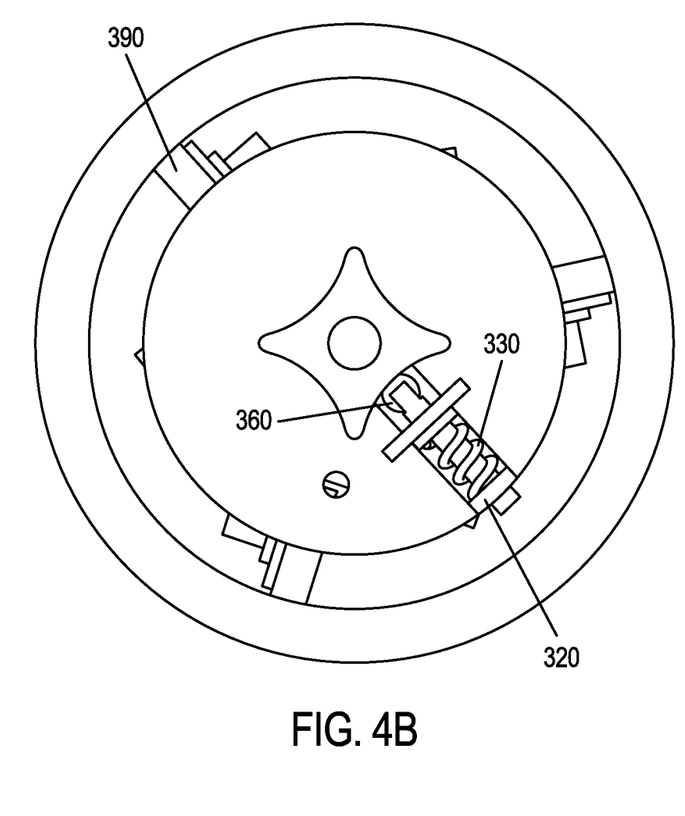

FIGS. 3A-3B are oblique and front views, respectively, of an example pipeline apparatus 300 having a single actuation probe or tool deployment mechanism for discrete point in-pipe applications, according to another embodiment. FIGS. 4A-4B are example front views of the pipeline apparatus 300 of FIGS. 3A-3B, in extended and retracted positions, respectively, according to an embodiment. In the pipeline apparatus 300, a mechanism for deploying a probe 310 (such as a DFT probe) and that is supported and centered (e.g., by wheels 390) with respect to a pipe 250 is provided.

In the pipeline apparatus 300, the probe measurement takes place inside the pipe 250 using the probe 310 in accordance with a stationary cam 380, a cam follower 360, and a rotating arm 370. The perimeter of the cam 380 defines a path for the probe 310 that is traced by the cam follower 360 using the rotating arm 370 for actuation. The four furthest points of the profile of the cam 380, specifically at 3 o'clock, 6 o'clock, 9 o'clock, and 12 o'clock positions (e.g., when the cam profile is furthest from the pipe axis and closest to the pipe inner wall), define the measurement locations for the probe 310 (e.g., when the probe 310 makes contact with the inner wall of the pipe 250, as shown in FIG. 4A). In some embodiments, the pipeline apparatus 300 further includes a longitudinal deployment mechanism (such as the wheels 390 and a motor) for longitudinal deployment (e.g., along the pipe axis).

In further detail, the cam follower 360 is coupled to the probe 310 via a coupling member 340 so that the probe 310 traces the same path as the cam follower 360 and the probe 310 and cam follower 360 move as a single unit. The cam follower 360 follows the outline (perimeter) of the cam 380 to define the path of the probe 310. The rotating arm 370 is actuated by a motor having an axis of rotation coinciding with the axis of the pipe 250. The rotating arm 370 rotates about this rotation axis, guiding the coupled probe 310/cam follower 360 around the perimeter of the cam 380 using two points of contact: a probe guide 320 near an (outside) end of the probe 310 close to the pipe 250, and a follower guide 350 near another end (e.g., an inside end) of the probe 310 close to the cam 380. The probe guide 320 and the follower guide 350 define a channel through which the probe 310/cam follower 360 extend and retract as they trace the perimeter of the cam 380. That is, the probe guide 320 and the follower guide 350 together guide the probe 310 (as coupled to the cam follower 360 via the coupling member 340) to extended (e.g., FIG. 4A) and retracted (e.g., FIG. 4B) positions based on the shape of the perimeter of the cam 380.

To this end, a spring 330 (e.g., a compression spring) is coupled between the probe guide 320 and the coupling member 340. The probe guide 320 is fixed with respect to the rotating arm 370, while the coupling member 340 moves with the probe 310 and the cam follower 360. The spring 330 is configured to exert sufficient force on the cam follower 360 (via the coupling member 340) to always keep the cam follower 360 next to (and following the path of) the perimeter of the cam 380. See FIGS. 4A-4B for examples of the spring 330 at its minimum and maximum lengths, respectively. The spring 330 also absorbs force of the radial deployment of the probe 310 on the inner wall of the pipe 250 when the probe 310 is extended.

The inside end of the probe 310 is coupled to the cam follower 360 via the coupling member 340. The cam follower 360 follows the path of the cam 380 under control of the rotating arm 370. The rotating arm 370 (single actuation) rotates about the inner circumference of the pipe 250 under control of the motor. The rotating arm 370 guides the probe 310/cam follower 360 rotationally via the motor and radially via the channel defined by the probe guide 320 and follower guide 350 together with the cam 380 and spring 330 (to radially follow the cam profile). As the rotating arm 370 rotates using an actuator, the probe 310 deploys as shown in FIG. 4A and retracts as shown in FIG. 4B to follow the cam profile.

Figure 5A:
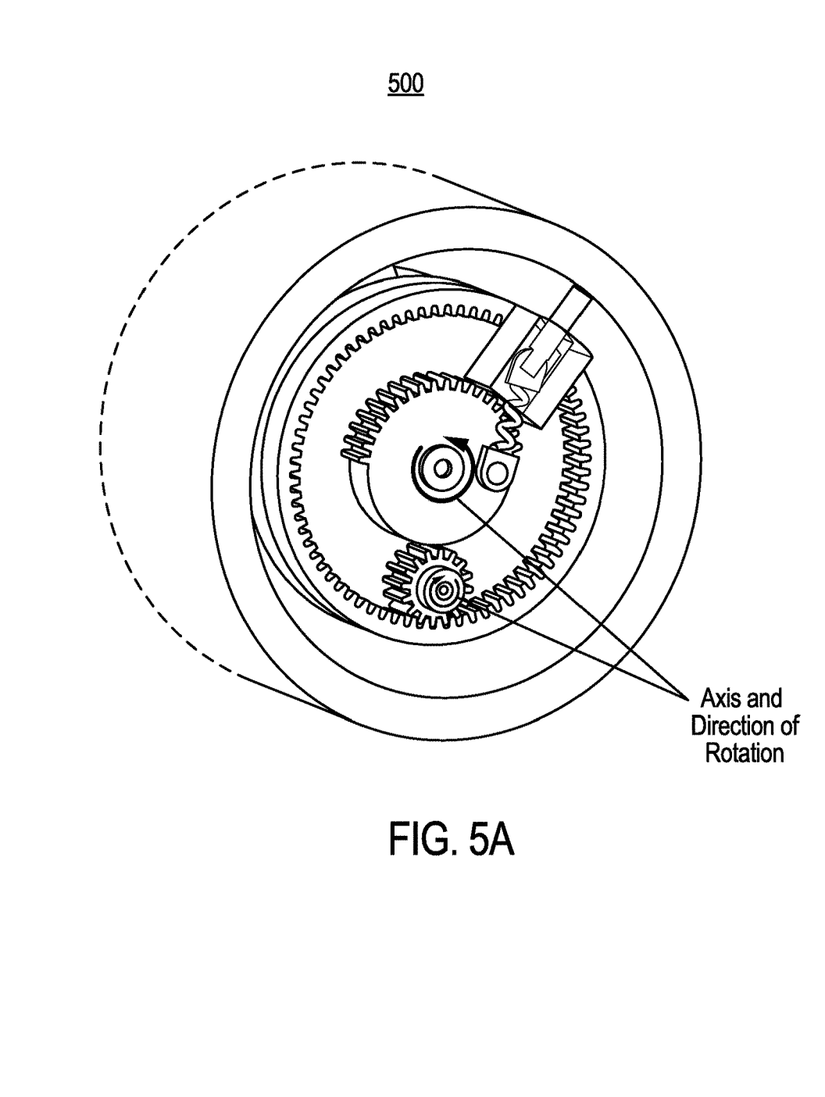
FIGS. 5A and 5B are oblique and front views, respectively, of an example pipeline apparatus having a single actuation probe or tool deployment mechanism for discrete point in-pipe applications, according to another embodiment.
Figure 5B:
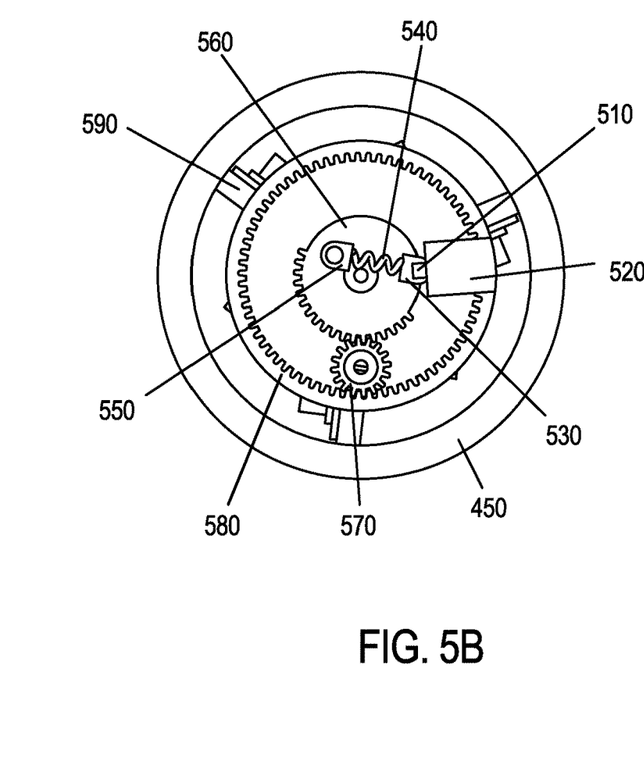
Figure 6A:
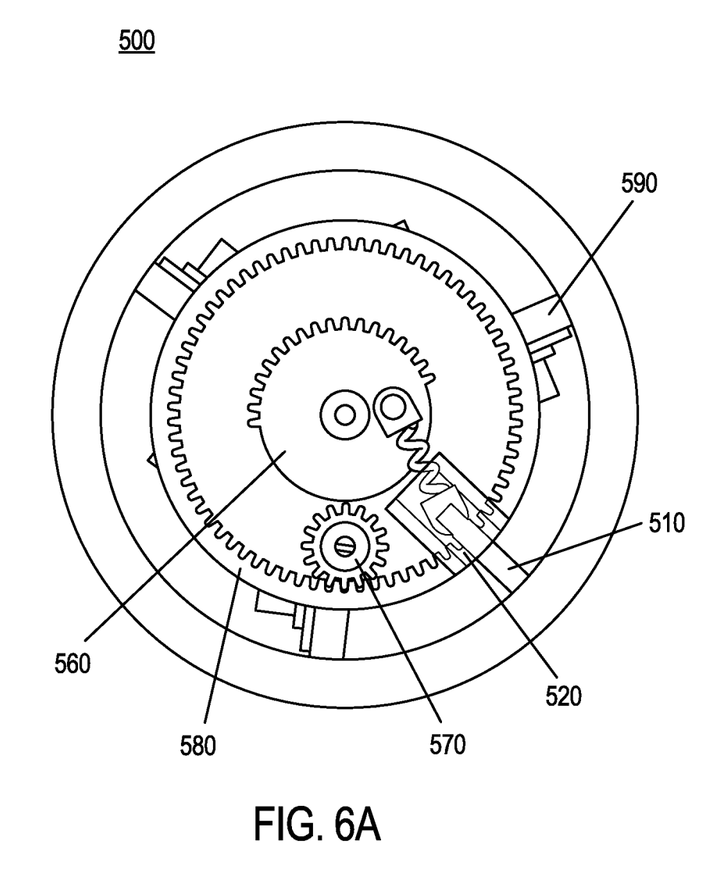
FIGS. 6A and 6B are example front views of the pipeline apparatus of FIGS. 5A and 5B, in extended and retracted positions, respectively, according to an embodiment.
Figure 6B:
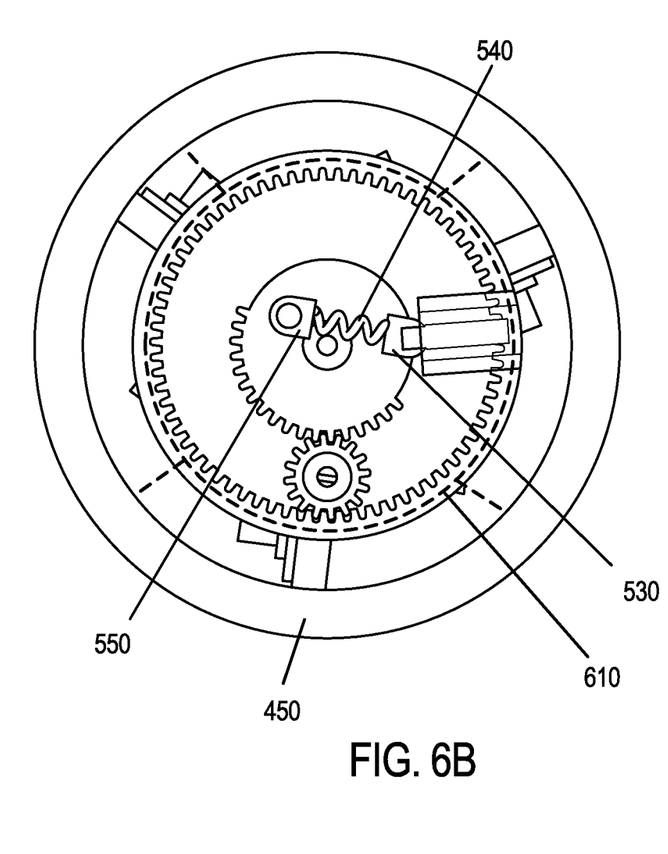

FIGS. 5A-5B are oblique and front views, respectively, of an example pipeline apparatus 500 having a single actuation probe or tool deployment mechanism for discrete point in-pipe applications, according to another embodiment. FIGS. 6A-6B are example front views of the pipeline apparatus 500 of FIGS. 5A-5B, in extended and retracted positions, respectively, according to an embodiment. In the pipeline apparatus 500, a mechanism for deploying a probe 510 (such as a DFT probe) and that is supported and centered (e.g., by wheels 590) with respect to a pipe 450 is provided.

In the pipeline apparatus 500, the probe 510 takes four measurements along the circumference of the inner wall of the pipe 450, in this case at 1:30 (e.g., FIG. 5A), 4:30 (e.g., FIG. 6A), 7:30, and 10:30 positions (as illustrated by probe-created path 610). The probe 510 is deployed by actuating a mutilated gear 560. A mutilated gear is a gear with only a subset of the number of gear teeth that would normally be found in a gear. The mutilated gear 560 is actuated by rotating it counterclockwise by a motor whose axis of rotation is the axis of the pipe 450 and the center of the mutilated gear 560. This provides the rotational deployment of the probe 510. The radial deployment is accomplished using a four-bar linkage with the mutilated gear 560 functioning as a crank. In some embodiments, the pipeline apparatus 500 further includes a longitudinal deployment mechanism (such as the wheels 590 and a motor) for longitudinal deployment (e.g., along the pipe axis).

In further detail, the probe 510 is deployed radially via a probe guide 520 that is coupled to a ring gear 580 close to the inner wall of the pipe 450 and having the pipe axis as a center. The probe 510 is deployed rotationally via the ring gear 580, which is configured to rotate clockwise (along with the probe guide 520) in response to the counterclockwise rotation of the mutilated gear 560, as transferred to the ring gear 580 via an intermediate planet gear 570. The ring gear 580 only rotates during the portion of the mutilated gear's rotation where the teeth of the mutilated gear 560 engage the planet gear 570 (e.g., FIGS. 5A and 6A), which rotates clockwise in response. The ring gear 580 remains stationary when the mutilated gear's teeth are not engaging the planet gear 570 (e.g., FIGS. 5B and 6B).

To this end, the mutilated gear 560 is configured in accordance with one embodiment to have one quarter the number of teeth as the ring gear 580, such that the ring gear 580 rotates one quarter turn for every engagement of the mutilated gear 560 with the planet gear 570. In other embodiments, different numbers or patterns of rotational deployment are possible using different corresponding mutilated gears. For example, in some embodiments, the number of teeth in the ring gear 580 is an integer multiple of the number of teeth in the mutilated gear 560. In FIGS. 5A-6B, the mutilated gear 560 is further configured to perform the one quarter turn rotations of the ring gear 580 and the probe 510 (via the probe guide 520) when the probe 510 is between taking measurements.

The mutilated gear 560 is also coupled to the probe 510 through an offset rotatable gear connector 550 that couples to one end of a spring 540 whose other end is coupled to a rotatable probe connector 530 that is coupled to one end (an inside end) of the probe 510. The spring 540 functions as a connecting rod of a four-bar linkage (specifically, a slider-crank linkage) that includes the mutilated gear 560 as the crank and the probe guide 520 as the slider. The linkage extends the probe 510 radially along the probe guide 520 (slider) such that the other end (the outside end) of the probe 510 contacts the inner wall of the pipe 450 to take a measurement. During such points of contact, the spring 540 also absorbs force of the radial deployment of the probe 510 on the inner wall of the pipe 450. The linkage further retracts the probe 510 during the course of its reciprocating motion after a measurement is taken. The mutilated gear 560 is further configured to rotationally deploy the probe 510 to the next measurement position on the inner circumference during this non-engagement period.

In summary, by actuating the mutilated gear 560 (e.g., using a rotational motor) that has an offset pin (e.g., gear connector 550) attached to an arm coupled with a spring (e.g., spring connecting rod 540) and connected to the probe (e.g., via probe connector 530), a slider-crank linkage of the mutilated gear 560 to the probe 510 (using the probe guide 520) is effected. The mechanism also has the probe guide 520 attached to the ring gear 580, which is rotated using a planet gear 570 that rotates freely through its fixed axis of rotation. As the mutilated gear 560 is actuated, the probe 510 deploys and retracts through the four-bar linkage as seen in FIGS. 6A-6B, respectively. Further, as the mutilated gear teeth engage, the planetary gear 570 and ring gear 580 activate and the probe guide 520 rotates the probe 510 (e.g., FIGS. 5B and 6B). The mutilated gear 560 is designed to only rotate the planet gear 570 when the probe 510 is retracted.

Figure 7A:
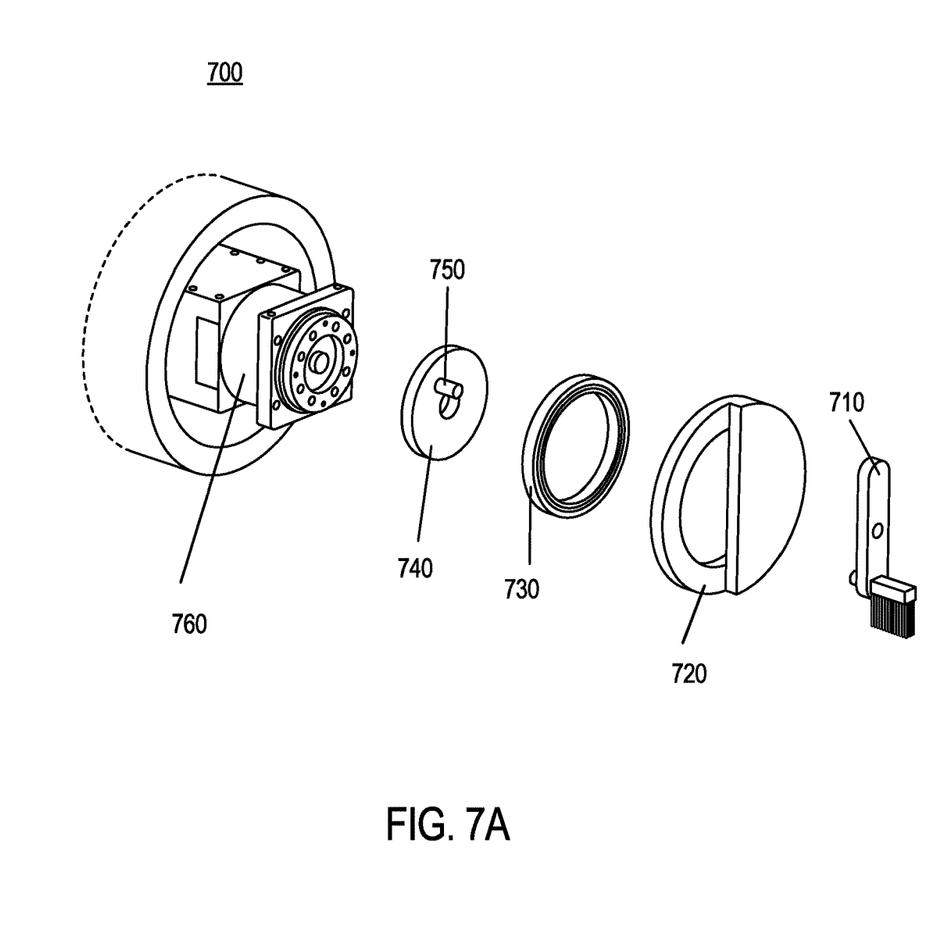
FIGS. 7A and 7B are exploded and front views, respectively, of an example pipeline apparatus having a single actuation probe or tool deployment mechanism for continuous in-pipe applications, according to an embodiment.
Figure 7B:
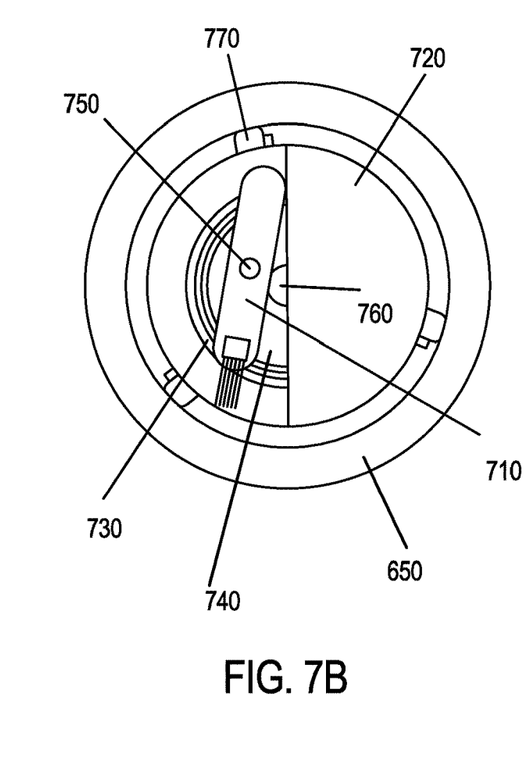
Figure 8A:
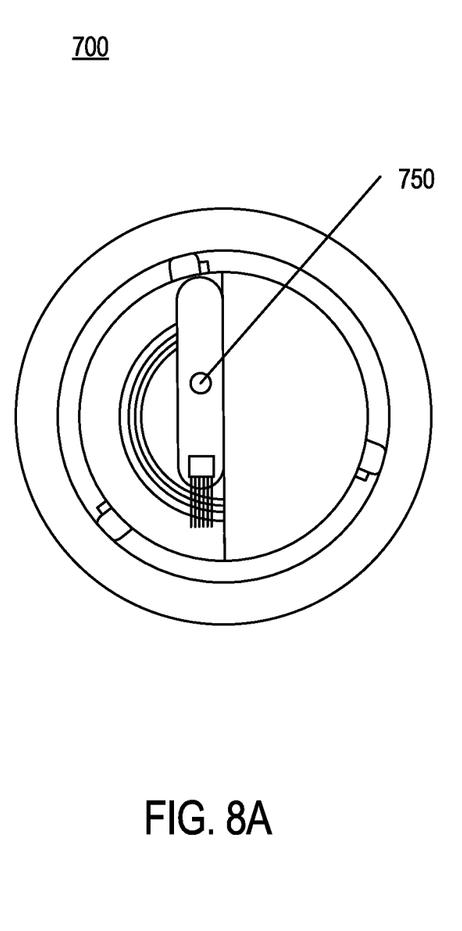
FIGS. 8A-8C are example front views of the pipeline apparatus of FIGS. 7A and 7B, in retracted, extended, and rotated positions, respectively, according to an embodiment.
Figure 8B:
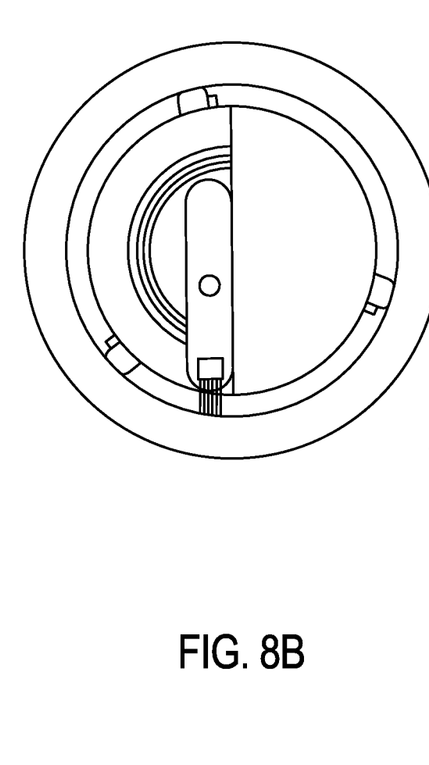
Figure 8C:
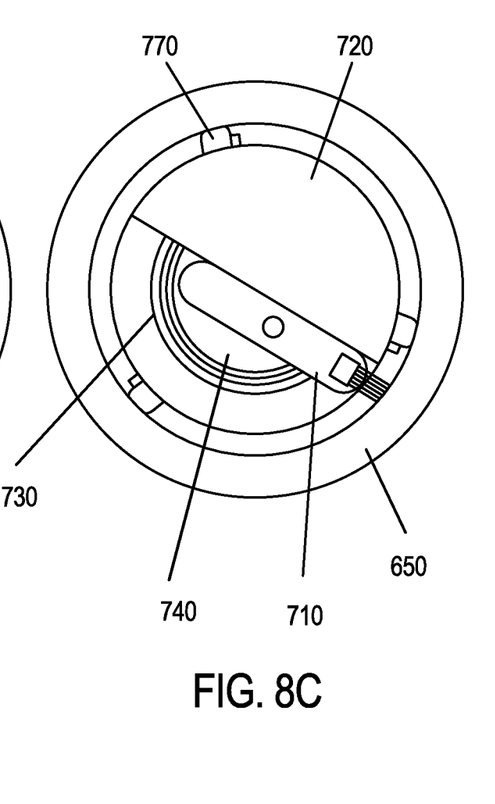

FIGS. 7A-7B are exploded and front views, respectively, of an example pipeline apparatus 700 having a single actuation probe or tool deployment mechanism for continuous in-pipe applications, according to an embodiment. FIGS. 8A-8C are example front views of the pipeline apparatus 700 of FIGS. 7A-7B, in retracted, extended, and rotated positions, respectively, according to an embodiment. In the pipeline apparatus 700, a mechanism for deploying a tool arm 710 (such as a holiday testing brush) and that is supported and centered (e.g., by wheels 770) with respect to a pipe 650 is provided.

In the pipeline apparatus 700, the tool arm 710 takes continuous measurements or scans along the circumference of the inner wall of the pipe 650, such as along an arc (e.g., from the 6 o'clock position counterclockwise to the 4 o'clock position, as in FIGS. 8B-8C) of or the entire inner circumference. The tool arm 710 is deployed radially and rotationally by actuating a deploying disk 740. The deploying disk 740 is actuated by rotating it counterclockwise (e.g., forwards) by a driving motor 760 whose axis of rotation is the axis of the pipe 650 and the center of the deploying disk 740. In some embodiments, the pipeline apparatus 700 further includes a longitudinal deployment mechanism (such as the wheels 770 and a motor) for longitudinal deployment (e.g., along the pipe axis).

In further detail, the tool arm 710 is deployed radially via an attachment member 750 and a limiting disk 720. In the pipeline apparatus 700, the attachment member 750 is part of (e.g., an extension of) and offset from the center of the deploying disk 740 (the pipe axis). Further, the tool arm 710 has three states of deployment: fully retracted (e.g., not extended, not touching the pipe inner wall, as in FIG. 8A), fully extended (e.g., touching the pipe inner wall, as in FIGS. 8B-8C), and somewhere between fully retracted and fully extended (e.g., partially extended, as in FIG. 7B).

In the fully retracted state, the tool arm 710 contacts the limiting disk 720 at multiple points, with the attachment member 750 being as close as possible (e.g., coupled) to the limiting disk 720 in the clockwise direction. In the fully extended state, the tool arm 710 contacts the limiting disk 720 at multiple points, with the attachment member 750 being as close as possible (e.g., coupled) to the limiting disk 720 in the counterclockwise direction. In the partially extended state, the tool arm 710 contacts the limiting disk 720 at no more than one point, with the attachment member 750 being somewhere between the closest positions in the clockwise and counterclockwise directions. As such, in the partially extended state, the limiting disk 720 has a rotational degree of freedom with respect to the deploying disk 740 and the tool arm 710.

In addition, the attachment member 750 moves the tool arm 710 from the fully retracted position to the fully extended position (and vice versa), as limited by the limiting disk 720. The limiting disk 720 limits the rotational degree of freedom of the tool arm 710 as shown in FIG. 7B. Once fully extended (see FIG. 8B), further counterclockwise actuation by the driving motor 760 rotates the extended tool arm 710 and the limiting disk 720 together counterclockwise around the inner wall of the pipe 650 (as shown in FIG. 8C). Likewise, once fully retracted (e.g., FIG. 8A), further clockwise actuation by the driving motor 760 rotates the retracted tool arm 710 and the limiting disk 720 together clockwise around the inner wall of the pipe 650. A bearing 730 enables coupling of the deploying disk 740 to the limiting disk 720 and the attachment member 750 while also enabling the deploying disk 740 to rotate freely with respect to the limiting disk 720 (e.g., when extending or retracting the tool arm 710) or to rotate in tandem with the limiting disk 720 (e.g., when rotating the tool arm 710 clockwise or counterclockwise about the inner circumference).

In summary, when the probe or tool (such as tool arm 710) is deployed continuously on the surface of the pipe 650 (as with a holiday detector brush), the mechanism shown in FIGS. 7A-8C can be used to account for deployment and rotation inside the pipe 650 using a single actuator (e.g., driving motor 760). The mechanism has a deploying disk 740 that has an offset pin (e.g., attachment member 750) on which the tool arm 710 is mounted. There is a bearing 730 between the deploying disk 740 and a passive limiting disk 720 to rotate the tool arm 710 once it is deployed. The sequence of operations is illustrated in FIGS. 8A-8C. The tool arm 710 begins in the retracted position (FIG. 8A), then the tool arm 710 is deployed as the deploying disk 740 is rotated counterclockwise by the driving motor 760 (FIG. 8B), and then the limiting disk 720 continuously rotates once the tool arm 710 is deployed and pushes on the limiting disk 720 (FIG. 8C). To retract the tool arm 710 back, the driving motor direction is reversed (clockwise).

Figure 9:
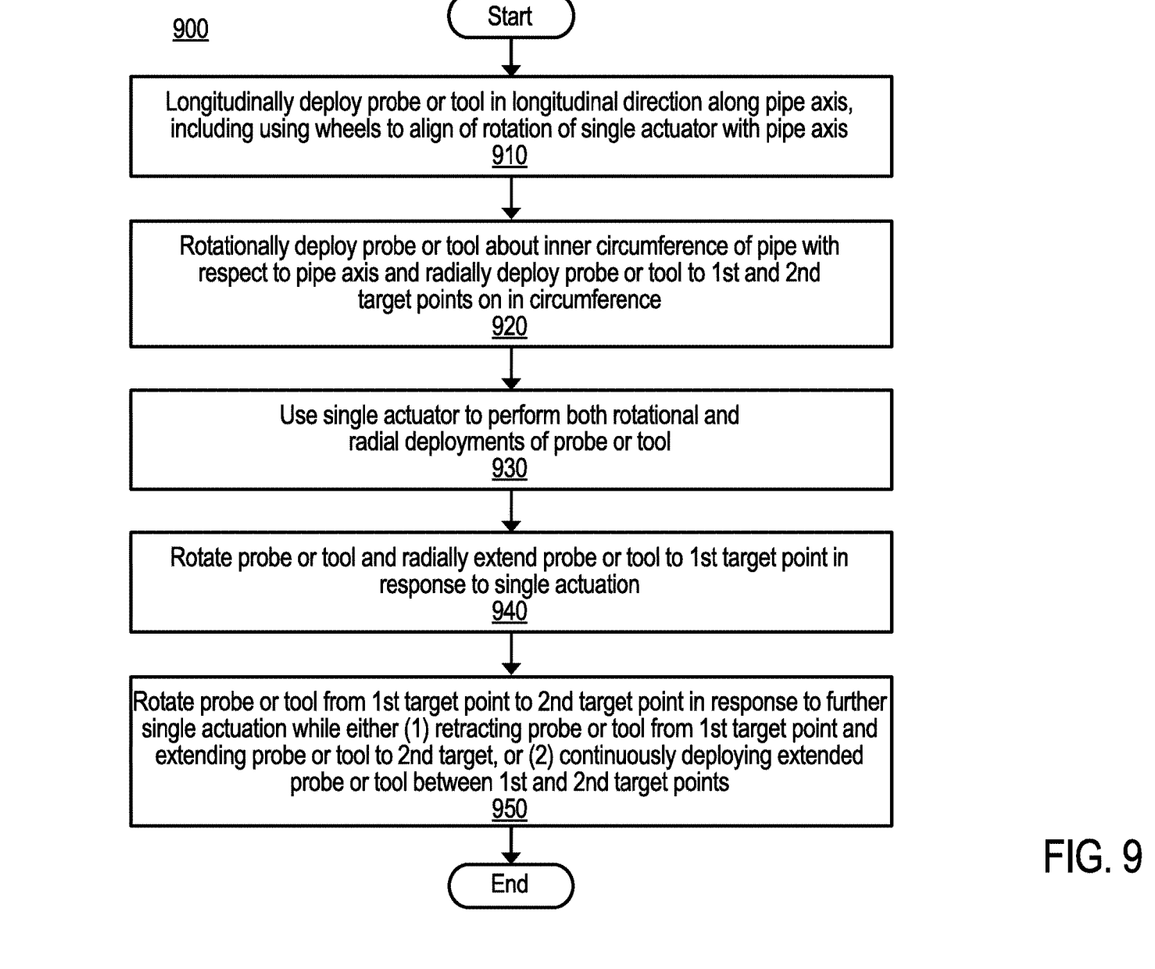
FIG. 9 is a flow chart of an example method of in-pipe inspection or maintenance, such as for use by the pipeline apparatuses of FIGS. 1 through 8C, according to an embodiment.

FIG. 9 is a flow chart of an example method 900 of in-pipe inspection or maintenance, such as for use by the pipeline apparatuses 100, 300, 500, and 700 of FIGS. 1-8C, according to an embodiment.

Some or all of the method 900 can be performed using components and techniques illustrated in FIGS. 1-8C. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 900 (or other disclosed method) to be carried out. It should be noted that in other embodiments, the order of the operations can be varied, and that some of the operations can be omitted.

In the example method 900, processing begins with automatically longitudinally deploying at step 910 (such as with a longitudinal deployment mechanism, which can include wheels 180, 390, 590, or 770) a probe or tool (such as probe 110, 310, or 510, or tool arm 710) in a longitudinal direction (such as lengthwise) along an axis of a pipe (such as pipe 50, 250, 450, or 650). Longitudinally deploying at step 910 includes using the wheels to align an axis of rotation of a single actuator (such as motor 160 or driving motor 760) with the pipe axis. The method 900 further includes rotationally deploying at step 920, using a single rotational and radial deployment mechanism (such as grooved path 150, cam 380, mutilated gear 560, or deploying disk 740), the probe or tool about an inner circumference of the pipe with respect to the pipe axis and also radially deploying the probe or tool to first and second target points on the inner circumference. The method 900 further includes automatically actuating at step 930, using the single actuator, the rotational and radial deployment mechanism to perform both the rotational and radial deployments of the probe or tool.

Rotationally and radially deploying at step 920 include rotating at step 940 the probe or tool and radially extending the probe or tool to the first target point in response to the single actuator actuating the rotational and radial deployment mechanism. Rotationally and radially deploying 920 deploying further include rotating at step 950 the probe or tool from the first target point to the second target point in response to the single actuator further actuating the rotational and radial deployment mechanism while either (1) retracting the probe or tool from the first target point and extending the probe or tool to the second target point (such as with the grooved path 150, cam 380, or mutilated gear 560), or (2) continuously deploying the extended probe or tool between the first and second target points (such as with the deploying disk 740).

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An in-pipe inspection or maintenance apparatus, the apparatus comprising:
    a single rotational and radial deployment mechanism to both rotationally deploy a probe or tool about an inner circumference of a pipe with respect to the axis of the pipe and radially deploy the probe or tool to first and second target points on the inner circumference; and
    a single actuator to automatically actuate the rotational and radial deployment mechanism to perform both the rotational and radial deployments of the probe or tool, wherein the rotational and radial deployment mechanism is further configured to:
        rotate the probe or tool and radially extend the probe or tool to the first target point in response to the single actuator actuating the rotational and radial deployment mechanism; and
        rotate the probe or tool from the first target point to the second target point in response to the single actuator further actuating the rotational and radial deployment mechanism while either:
            retracting the probe or tool from the first target point and extending the probe or tool to the second target point, or
            continuously deploying the extended probe or tool between the first and second target points.

2. The apparatus of claim 1, further comprising a longitudinal deployment mechanism to longitudinally deploy the probe or tool in a longitudinal direction along the pipe axis, wherein the longitudinal deployment mechanism comprises wheels to align an axis of rotation of the single actuator with the pipe axis.

3. The apparatus of claim 1, wherein the rotational and radial deployment mechanism is further configured to:
    both rotationally deploy the probe or tool and radially deploy the probe or tool to a third target point on the inner circumference; and
    rotate the probe or tool from the second target point to the third target point while retracting the probe or tool from the second target point and extending the probe or tool to the third target point, in response to the single actuator still further actuating the rotational and radial deployment mechanism.

4. The apparatus of claim 3, wherein the rotational and radial deployment mechanism comprises a grooved path to define a rotational and radial deployment path of the probe or tool (1) to the first target point, (2) from the first target point to the second target point, and (3) from the second target point to the third target point.

5. The apparatus of claim 4, wherein the rotational and radial deployment mechanism further comprises:
    a pin to couple to the probe or tool and guide the probe or tool in accordance with the grooved path; and
    a slotted arm to transfer a rotational force of the single actuator to the pin to perform the rotational deployment of the probe or tool, the slotted arm having a sliding guide to passively guide the pin along the grooved path to perform the radial deployment of the probe or tool.

6. The apparatus of claim 3, wherein the rotational and radial deployment mechanism comprises a cam to define a rotational and radial deployment path of the probe or tool (1) to the first target point, (2) from the first target point to the second target point, and (3) from the second target point to the third target point.

7. The apparatus of claim 6, wherein the rotational and radial deployment mechanism further comprises:
    a cam follower to couple to the probe or tool and passively guide the probe or tool in accordance with a perimeter of the cam; and
    a rotating arm to couple to the probe or tool and to transfer a rotational force of the single actuator to the probe or tool and the cam follower in order to perform the rotational deployment of the probe or tool while guiding the cam follower along the perimeter of the cam to perform the radial deployment of the probe or tool.

8. The apparatus of claim 7, wherein the rotating arm further comprises:
    a probe or tool guide to passively guide the probe or tool to and from the inner circumference in order to perform the radial deployment of the probe or tool; and a follower guide to passively guide the cam follower along the perimeter of the cam.

9. The apparatus of claim 8, wherein the rotational and radial deployment mechanism further comprises:
a coupling member to couple the probe or tool to the cam follower; and
a spring coupled between the probe or tool guide and the coupling member in order to engage the cam follower with the perimeter of the cam and to absorb force of the radial deployment of the probe or tool on the inner circumference.

10. The apparatus of claim 3, wherein the rotational and radial deployment mechanism comprises a mutilated gear to transfer a rotational force of the single actuator to the probe or tool in order to define a rotational and radial deployment path of the probe or tool (1) to the first target point, (2) from the first target point to the second target point, and (3) from the second target point to the third target point.

11. The apparatus of claim 10, wherein the rotational and radial deployment mechanism further comprises:
a ring gear having a guiding member to passively guide the probe or tool to and from the inner circumference in order to perform the radial deployment of the probe or tool; and
a planet gear to passively transfer a rotational force of the mutilated gear to the ring gear in order to perform the rotational deployment of the probe or tool.

12. The apparatus of claim 11, wherein a number of gear teeth of the ring gear is an integer multiple of a number of gear teeth of the mutilated gear.

13. The apparatus of claim 11, wherein the rotational and radial deployment mechanism further comprises:
a probe or tool connector to rotationally couple to the probe or tool;
a gear connector rotationally coupled to the mutilated gear at a pivot point that is offset from an axis of rotation of the mutilated gear; and
a spring coupled between the gear connector and the probe or tool connector in order to convert the rotational force of the mutilated gear to a radial force suitable for the radial deployment of the probe or tool through the guiding member and in order to absorb a force of the radial deployment of the probe or tool on the inner circumference.

14. The apparatus of claim 1, wherein the rotational and radial deployment mechanism further comprises:
a deploying disk positioned to rotationally couple to the probe or tool in order to transfer a rotational force of the single actuator to the probe or tool in order to perform both the rotational and radial deployments of the probe or tool; and
a limiting disk to passively couple to the probe or tool during the rotational deployment of the probe or tool and in order to have a rotational degree of freedom with respect to the deploying disk and the probe or tool during the radial deployment of the probe or tool.

15. The apparatus of claim 14, wherein the rotational and radial deployment mechanism further comprises:
an attachment member that is offset from the pipe axis in order to rotationally couple the probe or tool to the deploying disk; and
a bearing rotationally coupling the limiting disk to the deploying disk.

16. A method of in-pipe inspection or maintenance, the method comprising:
using a single rotational and radial deployment mechanism, both rotationally deploying a probe or tool about an inner circumference of a pipe with respect to the axis of the pipe and radially deploying the probe or tool to first and second target points on the inner circumference; and
automatically actuating, using a single actuator, the rotational and radial deployment mechanism to perform both the rotational and radial deployments of the probe or tool, wherein rotationally deploying and radially deploying comprise:
rotating the probe or tool and radially extending the probe or tool to the first target point in response to the single actuator actuating the rotational and radial deployment mechanism; and
rotating the probe or tool from the first target point to the second target point in response to the single actuator further actuating the rotational and radial deployment mechanism while either
retracting the probe or tool from the first target point and extending the probe or tool to the second target point, or
continuously deploying the extended probe or tool between the first and second target points.

17. The method of claim 16, further comprising automatically longitudinally deploying the probe or tool in a longitudinal direction along the pipe axis, wherein longitudinally deploying comprises using wheels to align an axis of rotation of the single actuator with the pipe axis.

18. The method of claim 16, wherein rotationally deploying and radially deploying further comprise:
both rotationally deploying the probe or tool and radially deploying the probe or tool to a third target point on the inner circumference; and
rotating the probe or tool from the second target point to the third target point while retracting the probe or tool from the second target point and extending the probe or tool to the third target point, in response to the single actuator still further actuating the rotational and radial deployment mechanism.

19. The method of claim 18, wherein rotationally deploying and radially deploying further comprise using a grooved path to define a rotational and radial deployment path of the probe or tool (1) to the first target point, (2) from the first target point to the second target point, and (3) from the second target point to the third target point.

20. The method of claim 19, wherein rotationally deploying and radially deploying further comprise:
coupling a pin to the probe or tool and guiding the probe or tool in accordance with the grooved path using the pin;
transferring a rotational force of the single actuator to the pin using a slotted arm to perform the rotational deployment of the probe or tool; and
passively guiding the pin along the grooved path using a sliding guide of the slotted arm to perform the radial deployment of the probe or tool.

21. The method of claim 18, wherein rotationally deploying and radially deploying further comprise using a cam to define a rotational and radial deployment path of the probe or tool (1) to the first target point, (2) from the first target point to the second target point, and (3) from the second target point to the third target point.

22. The method of claim 21, wherein rotationally deploying and radially deploying further comprise:
coupling a cam follower to the probe or tool and passively guiding the probe or tool in accordance with a perimeter of the cam using the cam follower; and coupling a rotating arm to the probe or tool and transferring a rotational force of the single actuator to the probe or tool and the cam follower using the rotating arm in order to perform the rotational deployment of the probe or tool while guiding the cam follower along the perimeter of the cam to perform the radial deployment of the probe or tool.

23. The method of claim 22, wherein transferring the rotational force of the single actuator further comprises:
passively guiding the probe or tool to and from the inner circumference using a probe or tool guide of the rotating arm in order to perform the radial deployment of the probe or tool; and
passively guiding the cam follower along the perimeter of the cam using a follower guide of the rotating arm.

24. The method of claim 23, wherein rotationally deploying and radially deploying further comprise:
coupling the probe or tool to the cam follower using a coupling member; and
coupling a spring between the probe or tool guide and the coupling member in order to engage the cam follower with the perimeter of the cam and to absorb force of the radial deployment of the probe or tool on the inner circumference.

25. The method of claim 18, wherein rotationally deploying and radially deploying further comprise transferring a rotational force of the single actuator to the probe or tool using a mutilated gear in order to define a rotational and radial deployment path of the probe or tool (1) to the first target point, (2) from the first target point to the second target point, and (3) from the second target point to the third target point.

26. The method of claim 25, wherein rotationally deploying and radially deploying further comprise:
passively guiding the probe or tool to and from the inner circumference using a guiding member of a ring gear in order to perform the radial deployment of the probe or tool; and
passively transferring a rotational force of the mutilated gear to the ring gear using a planet gear in order to perform the rotational deployment of the probe or tool.

27. The method of claim 26, wherein a number of gear teeth of the ring gear is an integer multiple of a number of gear teeth of the mutilated gear.

28. The method of claim 26, wherein rotationally deploying and radially deploying further comprise:
rotationally coupling a probe or tool connector to the probe or tool;
rotationally coupling a gear connector to the mutilated gear at a pivot point that is offset from an axis of rotation of the mutilated gear; and
coupling a spring between the gear connector and the probe or tool connector in order to convert the rotational force of the mutilated gear to a radial force to perform the radial deployment of the probe or tool through the guiding member, and in order to absorb force of the radial deployment of the probe or tool on the inner circumference.

29. The method of claim 16, wherein the rotational and radial deployment mechanism further comprises:
rotationally coupling a deploying disk to the probe or tool in order to transfer a rotational force of the single actuator to the probe or tool so as to perform both the rotational and radial deployments of the probe or tool; and
passively coupling a limiting disk to the probe or tool during the rotational deployment of the probe or tool, and providing a rotational degree of freedom to the limiting disk with respect to the deploying disk and the probe or tool during the radial deployment of the probe or tool.

30. The method of claim 29, wherein rotationally deploying and radially deploying further comprise:
rotationally coupling the probe or tool to the deploying disk using an attachment member that is offset from the pipe axis; and
rotationally coupling the limiting disk to the deploying disk using a bearing.

* * * * *